Feb. 13, 1934.  I. L. DUNN ET AL  1,946,576
PRESSURE RECORDING GAUGE
Filed March 12, 1932
Fig. 1.
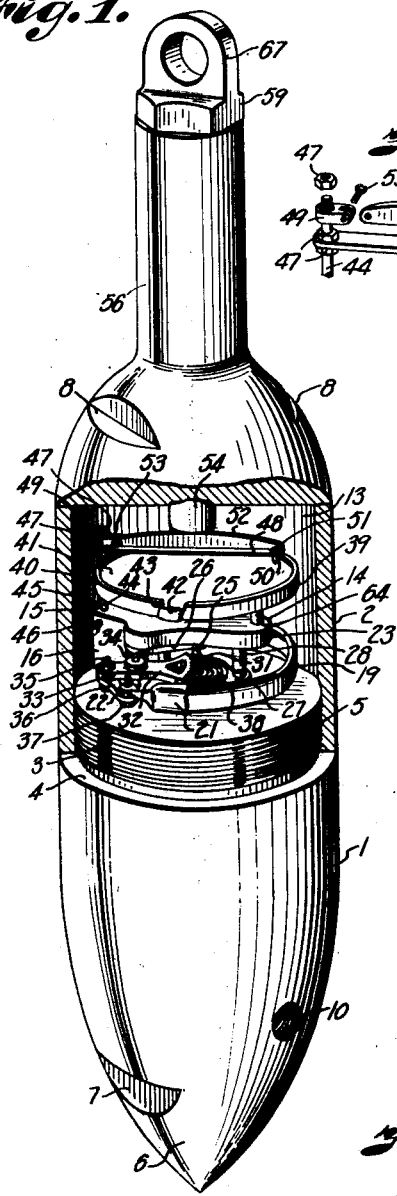
Fig. 4.
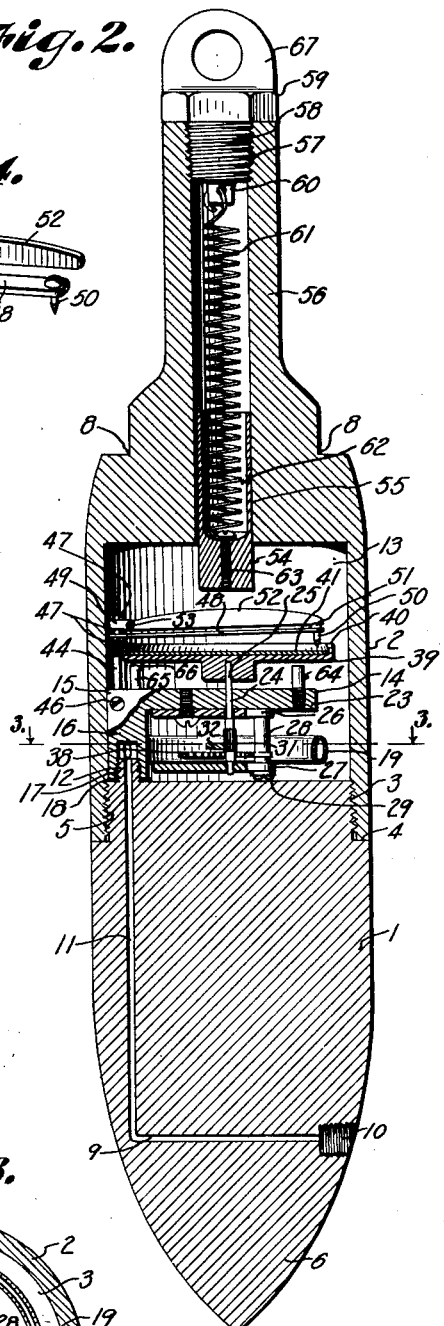
Fig. 2.
Fig. 3.
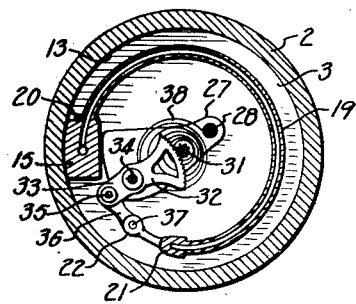
INVENTORS
Irwin L. Dunn
Harry F. Wright
and Harold S. Crooks
BY
ATTORNEY Patented Feb. 13, 1934

1,946,576

UNITED STATES PATENT OFFICE 1,946,576

PRESSURE RECORDING GAUGE

Irwin L. Dunn, Harry F. Wright, and Harold S. Crooks, Tulsa, Okla.

Application March 12, 1932. Serial No. 598,392

3 Claims. (Cl. 234—17)

Our invention relates to pressure measuring devices, and more particularly to pressure recording gauges for measuring and recording the reservoir pressure—commonly known as rock pressure—at various depths in oil and gas wells, or other borings.

The pressure existing at the producing horizon of an oil and/or gas pool is the primary source of energy utilized for removing fluid from the well, and a definite knowledge of this pressure is the most important requisite in determining the manner of and rate at which the oil and gas may be most efficiently and economically removed.

Because of wide variation in specific gravity of the column of fluid in a well, the only satisfactory method of measuring pressure in the bottom of the hole is to lower into the well a gauge which will measure and record the pressure at any given depth.

Various instruments have been devised for this purpose, some of them being capable of recording only a single pressure for each run of the instrument into the well, while others are exceedingly delicate and complicated.

The principal object of our invention is, therefore, to provide a gauge of simple and rugged construction whereby the pressures at various depths in a well may be recorded during a single run of the instrument into the well.

In accomplishing this and other objects of our invention we have provided improved details of structure, the preferred form of which is illustrated in the accompanying drawing, wherein:

Fig. 1 is a perspective view of a gauge constructed in accordance with our invention, a portion of the upper housing section being broken away to more clearly disclose the operating mechanism of the device.

Fig. 2 is a central vertical section of the instrument.

Fig. 3 is a cross section on the line 3—3, Fig. 2.

Fig. 4 is an enlarged detail perspective view of the marker pin and some of its operating elements.

Referring more in detail to the drawing:

1—2 designates lower and upper housing sections, the lower section having a reduced externally threaded neck 3 forming a lateral shoulder 4, and the upper cylindrical section having an internally threaded lower end 5 engaging the neck and abutting the lateral shoulder to produce a fluid tight joint between the sections.

The lower section terminates in a bullet type nose 6 to facilitate downward passage of the instrument through a conduit and through a column of liquid in the conduit, and notches 7 and 8 are provided adjacent the tapered end of the lower section and on the upper section for receiving suitable wrenches to thread the housing sections firmly together.

As shown in Fig. 2, the lower section comprises a solid body of metal to provide the necessary weight for insuring passage of the instrument through a heavy body of liquid, and within the body is formed an inlet channel 9 including a horizontal port opening through the side of the lower section of the housing for admission of well fluid to the instrument and preferably terminating in an enlarged internally threaded socket 10 adapted to receive the fitting of a suitable device for testing the accuracy of the instrument, the channel including a vertical branch 11 opening through an upstanding externally threaded boss 12 formed on the upper end of the lower section adjacent the edge thereof.

The upper section of the housing is counterbored to form a chamber 13 for receiving a pressure unit 14 including a bracket member 15 having a downwardly depending pedestal 16 provided with a threaded socket 17 to engage the upstanding boss 12 of the lower section, a lead washer 18, or the like, being preferably inserted between the pedestal and boss for sealing the joint between said members.

The unit 14 includes a tubular distensible member 19 of arcuate form having one end secured to the pedestal 16 by welding, or the like, as indicated at 20, to communicate the inlet channel with the tubular member. On its opposite end the distensible member is closed, as shown at 21, and terminates in an ear 22 pivotally connected to recording mechanism, now to be described in detail.

Extending laterally from the pedestal 16 is a horizontal shelf portion 23 provided on an axial line of the housing with a bearing opening 24 for rotatably receiving a shaft 25 journalled in the opening and in aligning openings of spaced plates 26 and 27, secured to the shelf portion by spacers 28 and screws 29.

Mounted on the shaft between the spaced plates is a gear 31 meshing with the sector 32 of an actuating arm 33 pivotally mounted on a shaft 34 also having opposite ends fixed in the spaced plates in parallel relation with the shaft 25. The outer end of the actuating arm is pivotally connected by a screw 35 to a link 36 connected in turn by a pin 37 with the ear 22 of the distensible member, so that distention of the tubular member, effected by increase of pressure entering the inlet port, will move the arm counter-clockwise, thereby rotating the shaft 25 in a clockwise direction.

A convolute spring 38 having its outer end fixed to one of the spacers and its inner end to the shaft 25, is provided to impart a slight tension on the arcuate member to assist in returning the member to normal position upon release of pressure from the instrument.

Mounted on and frictionally engaging the portion of the shaft 25 projecting through the shelf 23 is a circular carrier 39 having an upwardly and inwardly directed annular flange 40 for supporting and removably retaining a blank or graduated record disk 41 seated on the carrier.

As shown in Fig. 1 of the drawing, the disk is preferably provided with an ear 42 seated in a notched portion 43 of the flange to facilitate removal of the disk from the carrier and to prevent rotation of the disk independently of the carrier. If will be apparent that the blank disk may be graduated in any desirable manner to facilitate calculation of pressure existing in a well hole.

A post 44, seated in a socket 45 of the pedestal and held therein by a set screw 46, is threaded on its upper end for receiving nuts 47 to support a resilient finger 48 and a collar 49 in slightly spaced relation on the post. Fixed on the free end of the finger is a downwardly extending pin 50 having a head 51, preferably provided with a notch for receiving and supporting the outer end of an arm 52 hingedly connected with the collar 49 by a pivot pin 53. The arm 52 is adapted to be engaged by a weight 54 slidably mounted in a reduced bore 55 opening into the chamber 13 and extending upwardly and concentrically through a neck 56 provided on the upper housing section 2. At its upper end, the bore is internally threaded, as shown at 57, for engaging the threaded reduced portion 58 of an anchoring bolt 59. Formed on the lower end of the bolt is an apertured boss 60 for anchoring the upper end of a spring 61 having its lower end secured in a socket 62 of the weight by any suitable means, such as a screw 63 threaded into the weight.

In order that an excessive impact of the weight on the arm 52 will not bend the shaft 25, a stop post 64 is fixed adjacent the outer end of the shelf and projects into proximity with the carrier.

Cooperating stop members 65 and 66 are further, preferably, provided on the shelf and carrier respectively for limiting return movement of the carrier, the pressure unit being so designed that a pressure of approximately fifty pounds is required for initially moving the carrier.

An eye 67 may be formed integrally with the upper face of the anchoring bolt to receive a line for lowering or elevating the instrument in a well hole.

Assuming a device to be constructed and assembled as described, the operation thereof would be as follows:

A line, preferably a measuring line, is secured in the ear of the anchoring bolt, and the device is lowered by means of the line into a well. As the instrument travels downwardly into the well, the distensible member will be subjected to the pressure existing in the well and will distend in direct proportion to the well pressure, and the carrier being operably connected with the tubular member, will be correspondingly rotated.

After the instrument has been lowered to the desired depth the line is suddenly jerked to jar the instrument, which may be accomplished in various manners, such as permitting the instrument to drop for a slight distance and to then stop it abruptly, thereby causing the weight to continue downwardly under its own inertia and to strike the arm which in turn bends the resilient finger downwardly to cause the pin 50 to prick the disk and thus form a record on the disk.

As the well pressure varies at different depths, impressions made on the disk at intervals while the device is being lowered will provide a record of the pressures at different depths, and, if desired, similar impressions may be made on the disk at corresponding depths as the device is being elevated to determine whether or not the pressures have remained substantially constant.

After the instrument has been removed from the well bore, the housing sections are disassembled and after the record has been examined and the well pressure calculated therefrom the record may be filed for future reference.

From a knowledge of the existing pressures at different depths in the well, it will be possible to determine the size of tubing required for most efficiently and economically flowing a well by fluid pressure.

The pressures at the bottom of the well are also the index of the ability of the well to produce and from a periodic measurement of these pressures the decline in potential capacity and the probable ultimate production can be estimated.

Since with our device, the actual pressure at the bottom of a gas well, as distinct from oil wells, can be measured accurately, the potential capacity can be calculated much more accurately and rapidly than with present methods.

What we claim and desire to secure by Letters Patent is:

1. A pressure recording device including a housing, a rotatable carrier in the housing for supporting a record blank, means in the housing for rotating the carrier in response to pressure to be recorded, a marker, means normally yieldingly supporting the marker in spaced relation with the blank, an arm pivotally mounted adjacent said marker-supporting means, and a yieldingly supported weight member slidable in the housing and responsive to interrupted travel of the housing for striking said arm adjacent the marker-supporting means to effect contact of the marker with the blank.

2. A pressure recording device including a housing, a rotatable carrier in the housing for supporting a record blank, means in the housing for rotating the carrier in response to pressure to be recorded, a supporting post secured in the housing, a resilient finger having one end secured to said post, a marker on the opposite end of the finger, an arm pivotally connected to the post and adapted to engage the marker, and a yieldingly supported weight slidable in the housing and responsive to interrupted travel of the housing for striking said arm to effect contact of the marker with the blank.

3. In a device of the character described, a housing having a fluid-tight chamber, means in the chamber for rotatably supporting a record blank, a tubular, distensible member having an open end adapted for admitting fluid to the member and a closed end operatively connected with said supporting means for rotating the blank in accordance with variations in pressure of the fluid, a marker, means normally yieldingly supporting the marker in spaced relation with the blank, a weighted member responsive to interruption of travel of the housing for shifting said marker-supporting means to effect contact of the marker with the blank, and resilient means independent of the marker supporting means for yieldingly suspending said weighted member in the housing.

IRWIN L. DUNN.
HARRY F. WRIGHT.
HAROLD S. CROOKS.